April 15, 1924.
C. T. THORSSELL ET AL
1,490,546
APPARATUS FOR PRODUCING PURE NITROGEN
Filed Nov. 27, 1920
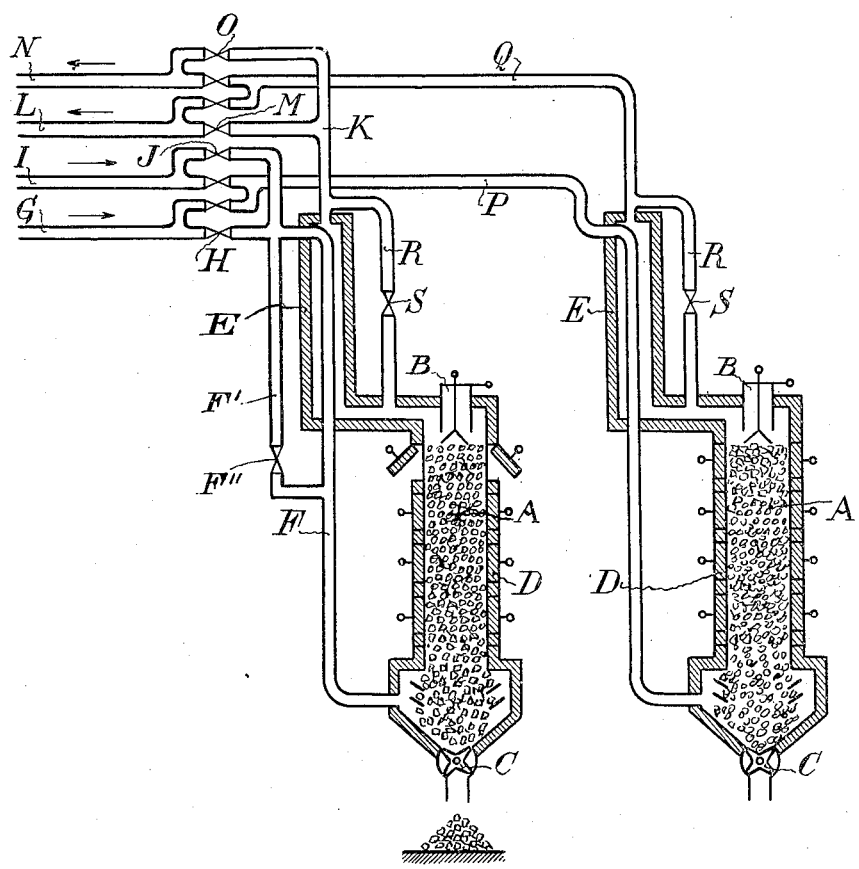
Inventors:
Carl Theodor Thorssell
and Harald Ludvig Reinhold Lundén Patented Apr. 15, 1924.

1,490,546

UNITED STATES PATENT OFFICE.

CARL THEODOR THORSSELL AND HARALD LUDVIG REINHOLD LUNDÉN, OF GOTTENBORG, SWEDEN, ASSIGNORS TO AKTIEBOLAGET KVÄFVEINDUSTRI, OF GOTTENBORG, SWEDEN, A COMPANY OF SWEDEN.

APPARATUS FOR PRODUCING PURE NITROGEN.

Application filed November 27, 1920. Serial No. 426,854.

*To all whom it may concern:*

Be it known that we, CARL THEODOR THORSSELL and HARALD LUDVIG REINHOLD LUNDÉN, residing at Gottenborg, in Sweden, have invented certain new and useful Improvements in Apparatus for Producing Pure Nitrogen.

The present invention refers to an apparatus for producing pure nitrogen. As known this may be accomplished by combining the oxygen in the air and in this manner disengaging the nitrogen in the same. For this purpose iron may be used, especially in a finely divided form in order that the oxygen may be absorbed more quickly, whereby the reactions occur in the following manner:

1. Elimination of oxygen $$3O + 2Fe \rightarrow Fe_2O_3.$$

2. Regeneration of the mass $$Fe_2O_3 + 6H \rightarrow Fe_2 + 3H_2O.$$

Thus the final result is a combustion of hydrogen gas $$3O + 6H \rightarrow 3H_2O.$$

As is well known heat is generated in the oxidation of the iron, whereas on the contrary heat is absorbed when the formed ferric oxide is reduced again in order to recover the iron. This results in an excess of heat, which is utilized in the apparatus in such a manner, that the entering gas is preheated by leaving gases. When using air for the production of nitrogen in this manner, however, such a great excess of heat is obtained that the same can not be utilized for said purpose. In order to overcome this disadvantage gases poor in oxygen, i. e. gases containing a smaller quantity of oxygen in relation to the nitrogen than contained in air may therefore be used as starting material according to this invention. Thus, gases suitable for this purpose are flue gases or combustion gases from industrial plants. A very good result is obtained by using such gases containing 10% of oxygen, as the quantity of heat obtained will be adapted to the conditions most suitable for the heating of the entering gases.

In the processes hitherto used for the production of pure nitrogen either outside heating to a high temperature is necessary as for instance when the oxygen is eliminated from the air by means of metallic copper, or a great amount of power is required, for instance at fractional distillation of liquid air. On the contrary, according to our new process no exterior heating at all is necessary, which results in a great saving. The characteristic feature of our invention consists in regulating the temperature conditions during the absorption of oxygen in such a manner that the quantity of heat generated during the absorption of oxygen, is used to replace the quantity of heat consumed during the regeneration of the mass in such a way that the operation is carried out without any outside heat.

In order to regulate the two quantities of heat, i. e. the one formed when the oxygen is absorbed and the one consumed during the regeneration of the mass, different methods may be resorted to.

For instance, a mixture of ordinary air and a gas with a content of oxygen less than the oxygen contained in the atmospheric air can be used, these two gases being mixed with each other in suitable proportions which can be regulated in such a way that a suitable temperature is obtained. If more air is mixed in, the temperature will be higher. The counter current principle can also be used, whereby gas containing oxygen is carried through a pipe filled with an active mass. In this way heat is generated, by means of which the departing gas, pure nitrogen, is heated. This hot gas preheats reducing gas (water gas) in the counter current apparatus which latter gas in a warm state is introduced into a pipe filled with mass which in a preceding operation has been used for liberating raw gas of its content of oxygen. For regulating the temperatures either the whole quantity of gas is preheated in the counter current apparatus or only a suitable, controllable part of the same, the other part passing the mass without being preheated. The regulating can however also be carried out in such a way that either the whole quantity of the departing gas or only a controllable part of the same is used for the preheating. All the hot deoxidized gas leaving the apparatus, or only a controllable part of the same may also be conducted through a counter current apparatus in such a way that the deoxidized gas here preheats either all the entering gas, from which the content of oxygen shall be removed or only a controllable part of the same, the part not preheated being introduced directly into the apparatus.

When using a counter current apparatus it is particularly convenient to arrange the same so that departing hot gas preheats the gas entering simultaneously into the same pipe or apparatus. In this way the danger is avoided, which is caused by possible small leakages in the apparatus, when different kinds of gases pass through the counter current apparatus, for instance danger of oxyhydrogen gas explosions, when gas containing oxygen is to be found on the one side and reducing gas or water gas on the other. Also in this case the temperature evidently can be regulated either by preheating all the entering gas by means of the departing gas or only a controllable part of the same, or also by such an arrangement, that either the whole quantity of departing hot gas or only a controllable part of the same delivers its heat to the entering gas.

The regulation of the temperature may also be effected by making the insulation of the apparatus adjustable. This can for instance be managed by means of special insulating plates which can be inserted and removed as wanted.

Moreover the quantity of the mass in the apparatus can be varied. If the temperature is too high, the quantity of the mass ought to be diminished in proportion to the size of the apparatus. The heat formed during the absorption of the oxygen, heats the mass and adjacent parts of the apparatus, and the heat accumulated in the mass and adjacent parts of the apparatus from a preceding oxidation is used for the regeneration of the mass. Therefore the capacity for heat of the mass and of the apparatus is regulated for instance by using a greater or smaller quantity of mass, or by mixing inactive material in the mass, if the temperature should be too high. As such inactive material pieces of iron may be used.

The invention is illustrated on the annexed drawing, which diagrammatically shows two apparatuses combined with each other for the production of pure nitrogen by alternative oxidation and reduction. A signifies two shafts for receiving the active mass, which is introduced into the shafts by the charging devices B at the top and removed at C at the bottom. The apparatuses A are covered with heat insulating plates D of a suitable material, which may be removed from or inserted in their places as wanted. They may also be adjustable in a suitable manner, for instance movable by means of hinges as shown. Thus the temperature in the apparatus can be regulated, by controlling the radiation of heat by means of these insulating plates. Each of the apparatuses A is connected at the top with a counter current apparatus E in which the gases are conducted in counter current in relation to the gases introduced into these apparatuses. The supply pipe F passes through the preheater E, which pipe is connected partly with the supply pipe G for the mixture of nitrogen and oxygen through the valve H and partly with the supply pipe I for reducing gas through the valve J. The gases departing through the preheating apparatus and flowing around the pipe F are carried off through the pipe K which is connected partly with the outlet pipe L for pure nitrogen through the valve M and partly with the outlet pipe N for the reducing gas through the valve O. The pipes G and I are also by special stop valves connected with a pipe P leading to the other apparatus A through the preheater E of the latter and in the same manner the pipes L and N are by special valves connected with an outlet pipe Q leading from the preheater E of the last mentioned apparatus. Each apparatus A is directly connected with the respective outlet pipes K and Q by means of special pipes R arranged outside of the counter current apparatuses. These pipes R are provided with controlling valves S. Thus by means of the construction as shown all the entering gas containing oxygen is preheated by the deoxidized gas leaving the apparatus or by only a part of the same according to the position of the controlling valve S. Moreover all the deoxidized gas introduced is heated by means of the escaping hot nitrogen or by only a part of the same according to the position of the valve S.

As shown on the drawing, part of the nitrogen and oxygen containing gas and part of the reducing gas can be conducted into the active mass through a conduit F' controlled by a valve F'' without being preheated by the escaping heated nitrogen and the escaping heated reducing gas.

What we claim is:—

1. In an apparatus for producing pure nitrogen, comprising a retort adapted to receive an oxygen absorbing mass and having a gas inlet and a gas outlet, a heat exchanging device connected with the said retort, a supply conduit for admitting to the said retort a mixture of nitrogen and oxygen, a second supply conduit for supplying to the said retort a reducing gas, the said conduits discharging into another conduit, being adapted to receive heat in the said heat exchanging device, two discharge conduits, means for connecting the gas inlet of the said retort alternately to the said supply conduits, and means for connecting the gas outlet of the said retort to the said discharge conduits.

2. An apparatus as specified in claim 1, comprising also a by-pass conduit for the incoming gases, and a valve therein for controlling the flow of gases through the said by-pass conduit.

3. An apparatus as specified in claim 1, comprising also a by-pass conduit for the outgoing gases, and a valve therein for controlling the flow of gases through the said by-pass conduit.

4. In an apparatus for producing pure nitrogen, comprising a retort adapted to receive an oxygen absorbing mass and having a gas inlet and a gas outlet, a heat exchanging device connected with the said retort, a supply conduit for admitting to the said retort a mixture of nitrogen and oxygen, a second supply conduit for supplying to the said retort a reducing gas, the said conduits discharging into another conduit, being adapted to receive heat in the said heat exchanging device, two discharge conduits, means for connecting the gas inlet of the said retort alternately to the said supply conduits, means for connecting the gas outlet of the said retort to the said discharge conduits, by-pass conduits for the incoming and outgoing gases and valves therein for controlling the flow of gases through the said by-pass conduits.

In testimony whereof, we have signed our names to this specification in the presence of two subscribing witnesses.

CARL THEODOR THORSSELL.
HARALD LUDVIG REINHOLD LUNDÉN.

Witnesses:
HJ. BRANZELL,
FRED FLERON.